No. 714,474. Patented Nov. 25, 1902.
G. G. GOING.
SHADE CORD FASTENER.
(Application filed Apr. 24, 1902.)
(No Model.)

WITNESSES:
H. A. Lamb
M. J. Lougdus

INVENTOR
G. G. Going
BY
ATTORNEY

UNITED STATES PATENT OFFICE.

GEORGE G. GOING, OF NEW YORK, N. Y.

SHADE-CORD FASTENER.

SPECIFICATION forming part of Letters Patent No. 714,474, dated November 25, 1902.

Application filed April 24, 1902. Serial No. 104,453. (No model.)

*To all whom it may concern:*

Be it known that I, GEORGE G. GOING, a citizen of the United States, residing at New York, in the county of New York and State of New York, have invented certain new and useful Improvements in Shade-Cord Fasteners; and I do hereby declare the following to be a full, clear, and exact description of the invention, such as will enable others skilled in the art to which it appertains to make and use the same.

My invention relates to certain new and useful improvements in shade-cord fasteners, and has for its object to provide a very simple device of this description, neat of appearance and in which the cord is not likely to become twisted or entangled.

Figure 1:
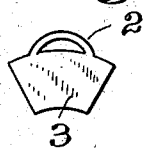
Figure 2:
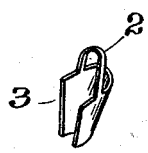
Figure 3:
Figure 4:

In the accompanying drawings, which form a part of this application, Figure 1 is a plan of the blank from which the body of my holder is made; Fig. 2, a perspective showing said blank partly bent into the completed shape; Fig. 3, an elevation of the body of my improved holder; Fig. 4, a vertical section of the same with the cord secured in position therein, and Fig. 5 an elevation showing my improvement attached to the bottom of a shade.

Similar numbers of reference denote like parts in the several figures of the drawings.

Figure 5:
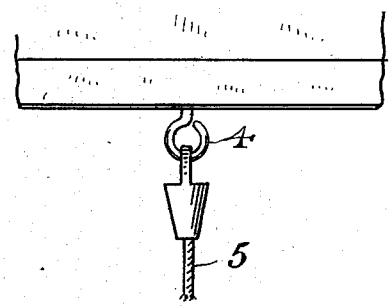

The body 1 of my improved holder resembles in shape an inverted frustum of a cone, and rising from the upper or enlarged end of said body is a bail 2. The body is formed from a sheet-metal blank 3, such as is shown at Fig. 1, with inclined sides and curved top and bottom, so that when said blank is curled into completed form a hollow body will be provided, having a general conical shape enlarged at the top and smaller at the bottom, with the bail 2 rising from the top. Passing through this bail is a screw-eye 4, which is driven directly into the bottom of the shade, and a cord 5, having its end knotted, so as to afford an enlargement, is drawn down within the body 1, so as to become firmly wedged therein, all as shown at Figs. 4 and 5.

It will be observed that the connection thus afforded between my improvement and the shade itself has all the benefits of a universal joint and that therefore there can be no entanglement or twisting of the cord, and, moreover, there are no unsightly knots which can appear to the eye of the observer.

Having thus described my invention, what I claim as new, and desire to secure by Letters Patent, is—

The herein-described shade-cord fastener comprising a hollow conical-shaped body and a bail rising from the top of said body, both bail and body formed from a single blank of sheet metal, the opening in the body being largest at the top and smallest at the bottom whereby a knotted string may be drawn through the bottom and tightly wedged within the body, and a screw-eye driven within the bottom of the shade from which eye said bail is suspended, substantially as set forth.

In testimony whereof I affix my signature in presence of two witnesses.

GEORGE G. GOING.

Witnesses:
F. BRODSKY,
ANTHONY UTZ.